United States Patent
Fout et al.

(10) Patent No.: US 10,246,956 B2
(45) Date of Patent: Apr. 2, 2019

(54) SYSTEM AND METHOD FOR RECYCLING LIQUID SEPARATED FROM WELLBORE CUTTINGS

(71) Applicants: M-I L.L.C., Houston, TX (US); MANTOVANI & VICENTINI S.R.L., Berra (IT)

(72) Inventors: Gary Fout, Cypress, TX (US); Leonardo Renzo Vicentini, Ferrara (IT)

(*) Notice: Subject to any disclaimer, the term of this patent is extended or adjusted under 35 U.S.C. 154(b) by 0 days.

(21) Appl. No.: 15/737,309

(22) PCT Filed: Jun. 29, 2016

(86) PCT No.: PCT/US2016/039920
§ 371 (c)(1),
(2) Date: Dec. 17, 2017

(87) PCT Pub. No.: WO2017/004096
PCT Pub. Date: Jan. 5, 2017

(65) Prior Publication Data
US 2018/0202245 A1   Jul. 19, 2018

Related U.S. Application Data

(60) Provisional application No. 62/185,999, filed on Jun. 29, 2015.

(51) Int. Cl.
 *E21B 21/06* (2006.01)
 *B01D 21/26* (2006.01)
 *B01D 21/01* (2006.01)
(52) U.S. Cl.
 CPC ............ *E21B 21/066* (2013.01); *B01D 21/01* (2013.01); *B01D 21/262* (2013.01)

(58) Field of Classification Search
None
See application file for complete search history.

(56) References Cited

U.S. PATENT DOCUMENTS 3,433,312 A * 3/1969 Burdyn ................. E21B 21/063
                                                            175/66
5,107,874 A * 4/1992 Flanigan .............. B01D 11/028
                                                           134/105

(Continued)

FOREIGN PATENT DOCUMENTS

WO    2014/196956 A1   12/2014

OTHER PUBLICATIONS

International Preliminary Report on Patentability for the equivalent International patent application PCT/US2016/039920 dated Jan. 11, 2018.

(Continued)

*Primary Examiner* — Anuradha Ahuja
(74) *Attorney, Agent, or Firm* — Paula B. Whitten (57) ABSTRACT

Systems and methods recycle liquid(s) by introducing at least a portion of a first liquid from a first centrifuge into a tank. At least a portion of a second liquid is introduced from a second centrifuge into the tank. The first liquid and the second liquid are mixed together in the tank to produce a mixed liquid. At least a portion of the mixed liquid is introduced from the tank into the second centrifuge. Particles from the mixed liquid are separated using the second centrifuge, thereby producing the at least a portion of the second liquid that is introduced from the second centrifuge into the tank.

19 Claims, 5 Drawing Sheets

(56) References Cited

U.S. PATENT DOCUMENTS

| | | | |
|---|---|---|---|
| 6,073,709 A * | 6/2000 | Hensley | E21B 21/06 |
| | | | 166/267 |
| 6,177,014 B1 | 1/2001 | Potter et al. | |
| 2004/0016572 A1 | 1/2004 | Wylie et al. | |
| 2008/0283301 A1* | 11/2008 | Sherwood | E21B 21/01 |
| | | | 175/206 |
| 2009/0107728 A1 | 4/2009 | Gaddis et al. | |
| 2014/0116964 A1 | 5/2014 | Bevan et al. | |

OTHER PUBLICATIONS

International Search Report and Written Opinion for the equivalent International patent application PCT/US2016/039920 dated Sep. 12, 2016.

\* cited by examiner

SYSTEM AND METHOD FOR RECYCLING LIQUID SEPARATED FROM WELLBORE CUTTINGS

CROSS-REFERENCE TO RELATED APPLICATION

The present document is based on and claims priority to U.S. Provisional Application Ser. No. 62/185,999, filed Jun. 29, 2015, which is incorporated herein by reference in its entirety.

BACKGROUND INFORMATION

A downhole tool may be run into a wellbore. The downhole tool may include a mud motor and a drill bit. To drill the wellbore to greater depths, a drilling fluid may be pumped through the downhole tool from a surface location. The drilling fluid may flow through the mud motor in the downhole tool, which may cause the mud motor to rotate the drill bit. Rotation of the drill bit may dislodge cuttings from the surrounding formation, and the drilling fluid and the cuttings may flow back up to the surface through an annulus formed between the downhole tool and a wall of the wellbore.

Once the cuttings and drilling fluid reaches the surface, the cuttings and the fluid may be introduced to a shaker, which may remove a portion of the liquid (e.g., drilling fluid, water, hydrocarbons) from the cuttings.

The liquid that is separated from the cuttings may have fine particles dispersed therein. For example, the fine particles may make up about 30% of the volume of the liquid that is separated from the cuttings, causing the liquid to be very viscous. This liquid can be introduced into a centrifuge; however, the liquid may be too viscous for the centrifuge to remove the desired amount of particles from the liquid.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are illustrative embodiments, and are, therefore, not to be considered limiting of its scope.

DETAILED DESCRIPTION

Figure 1:
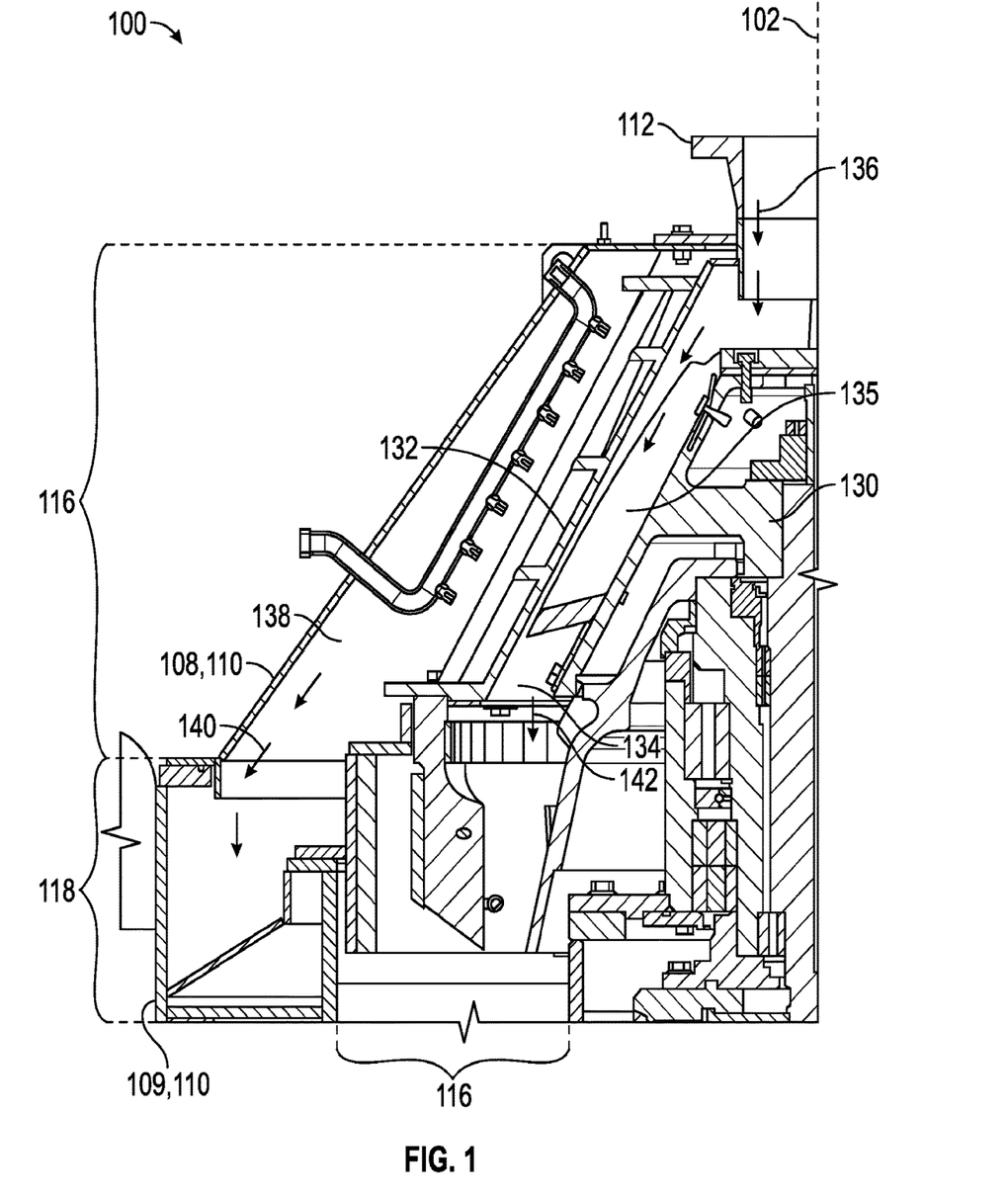
FIG. 1 depicts a portion of a side cross-sectional view of a centrifuge, according to an embodiment.

FIG. 1 depicts a portion of a side cross-sectional view of a centrifuge 100, according to an embodiment. The centrifuge 100 may be any type of centrifuge, such as a centrifugal separator, decanter, or a centrifugal dryer. FIG. 1 sets forth one example of a centrifuge, a vertical centrifugal dryer, however, a person having ordinary skill in the art will appreciate that other types of centrifuges can be used.

As shown in FIG. 1, the centrifuge 100 may include a housing 110. The housing 110 may include an upper portion 108 referred to as a shield and a lower portion 109 referred to as a frame. The upper portion 108 of the housing 110 may include one or more inlets (one is shown: 112). The inlet 112 may provide a path of fluid communication into a separation section 116 of the centrifuge 100.

The separation section 116 of the centrifuge 100 may include a cone 130. The cone 130 may have a conical or frustoconical shape. As such, the cross-sectional length (e.g., diameter) of the cone 130 may increase moving downward (e.g., away from the inlet 112). The cone 130 may be configured to rotate around a central longitudinal axis 102 through the housing 110. For example, the cone 130 may rotate from about 490 RPM to about 1480 RPM or from about 690 RPM to about 985 RPM. One or more blades 135 may be coupled to the cone 130 and extend radially-outward therefrom.

The separation section 116 of the centrifuge 100 may also include a basket 132 positioned at least partially around the cone 130. The basket 132 may have a plurality of openings formed laterally (e.g., radially) therethrough. For example, the basket 132 may be or include a screen. The openings in the screen or the basket 132 may have a cross-sectional length (e.g., diameter) from about 0.1 mm to about 0.6 mm. The cross-sectional length of the basket 132 may increase moving downward (e.g., away from the inlet 112). The basket 132 may be configured to rotate around the central longitudinal axis 102 through the housing 110. More particularly, the basket 132 may rotate in the same direction as the cone 130 but faster than the cone 130. For example, the basket 132 may rotate from about 500 RPM to about 1500 RPM or from about 700 RPM to about 1000 RPM.

A first, inner annulus 134 may be defined between the cone 130 and the basket 132. Similar to the cone 130 and the basket 132, the cross-sectional length of the inner annulus 134 may also increase moving downward (e.g., away from the inlet 112). Cuttings from a wellbore may flow through the inlet 112 of the centrifuge 100 and into the inner annulus 134, as shown by arrows 136. Gravity may cause the cuttings to descend through the inner annulus 134 (e.g., away from the inlet 112). The blades 135 may also push the cuttings downward. Simultaneously, the rotation of the cone 130 and the basket 132 may exert a centrifugal force on the cuttings that causes the cuttings to move radially-outward and into contact with the basket 132. Once the cuttings contact the basket 132, at least a portion of the liquid in the cuttings may be separated from the cuttings and pass through the openings in the basket 132 to a second, outer annulus 138 that is formed between the basket 132 and the upper portion 108 of the housing 110.

After passing through the openings in the basket 132 and into the outer annulus 138, the liquid may flow down through the outer annulus 138, exit the separation section 116 of the centrifuge 100, and enter a launder section 118 of the centrifuge 100, as shown by arrows 140. The remaining cuttings, now dryer than they were when they entered the centrifuge 100, may continue to flow down the inner annulus 134, exit the separation section 116 of the centrifuge 100, and enter the launder section 118 of the centrifuge 100, as shown by arrows 142. The launder section 118 may be positioned below the separation section 116.

Figure 2:
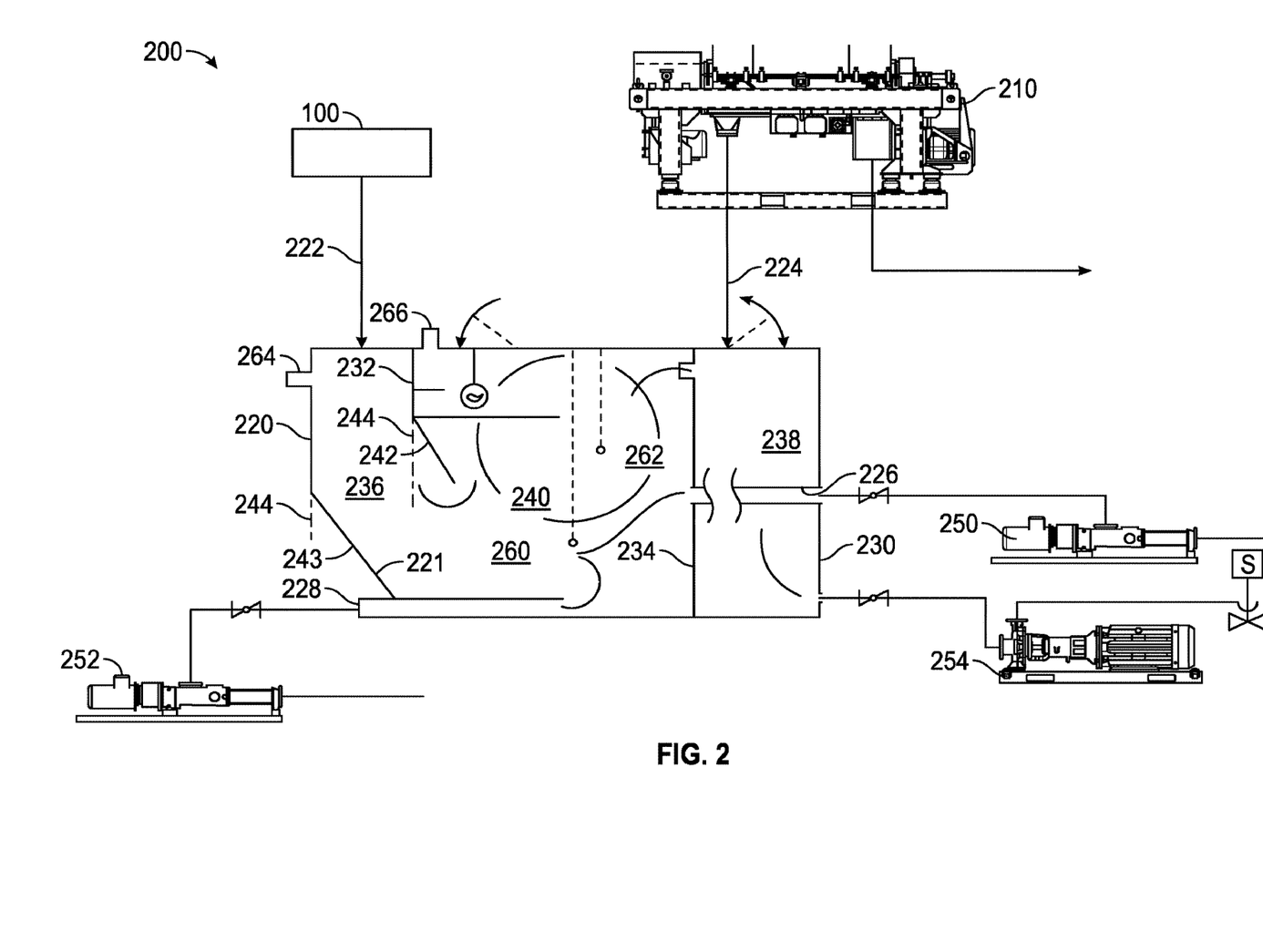
FIG. 2 depicts a schematic view of a system for recycling liquid that has been separated from wellbore cuttings, according to an embodiment.

FIG. 2 depicts a schematic view of a system 200 for recycling liquid that has been separated from wellbore cuttings, according to an embodiment. The system 200 may include a first centrifuge 100, a second centrifuge 210, a tank 220, and one or more pumps (three are shown: 250, 252, 254). As shown, the first centrifuge 100 may be or include the vertical centrifugal dryer shown in FIG. 1 and described above. However, in other embodiments, the first centrifuge 100 may be or include a horizontal centrifugal decanter or other type of centrifuge. As shown, the second centrifuge 210 can be a horizontal centrifugal decanter. However, in other embodiments, the second centrifuge 210 may be any other type of centrifuge as will be appreciated by a person having ordinary skill in the art, including a centrifugal dryer, such as a vertical centrifugal dryer.

The tank 220 may have one or more inlets (two are shown: 222, 224) and one or more outlets (three are shown: 226, 228, 230). One or more partitions (two are shown: 232, 234) may be positioned in an internal volume of the tank 220. The partitions 232, 234 may at least partially separate different portions of the internal volume. For example, the first partition 232 may at least partially separate a first portion of the internal volume 236 from a third portion of the internal volume 240. The second partition 234 may at least partially separate a second portion of the internal volume 238 from the third portion of the internal volume 240.

In at least one embodiment, at least a portion of the first partition 232 may be oriented at an angle 242 with respect to a central longitudinal axis 244 through the tank 220. As shown, the portion of the first partition 232 may deflect toward or into the third portion of the internal volume 240 to direct fluid entering the first portion of the internal volume 236 of the tank 220 through the first inlet 222 to flow into the third portion of the internal volume 240 and mix with the liquid therein. The angle 242 may be from about 10 degrees to about 80 degrees or about 30 degrees to about 60 degrees. At least a portion of the side wall 221 of the tank 220 may also be oriented at an angle 243 with respect to the central longitudinal axis 244 through the tank 220 for the same purpose. The angle 243 may be from about 10 degrees to about 80 degrees or about 30 degrees to about 60 degrees.

The tank 220 may also include one or more level sensors that are configured to measure a level of the liquid in the tank 220. The level sensor(s) may sense when the level of the liquid falls below a predetermined minimum value 260 and/or exceeds a predetermined maximum value 262. The level sensor(s) may be positioned within the first portion of the internal volume 236 of the tank 220 and/or the third portion of the internal volume 240 of the tank 220.

The tank 220 may also include an overflow line 264 that provides a path for the liquid to flow in the event that the liquid exceeds the maximum level 262. This may occur, for example, if one or more of the pumps 250, 252, 254 fails. The overflow line 264 may lead to another tank or storage area. The tank 220 may include a vent line 266 that may allow gas (e.g., air) to flow into and out of the tank 220 when the liquid is being introduced to and pumped out of the tank 220. Thus, the vent line 266 may allow the tank 220 to breathe.

Figure 3:
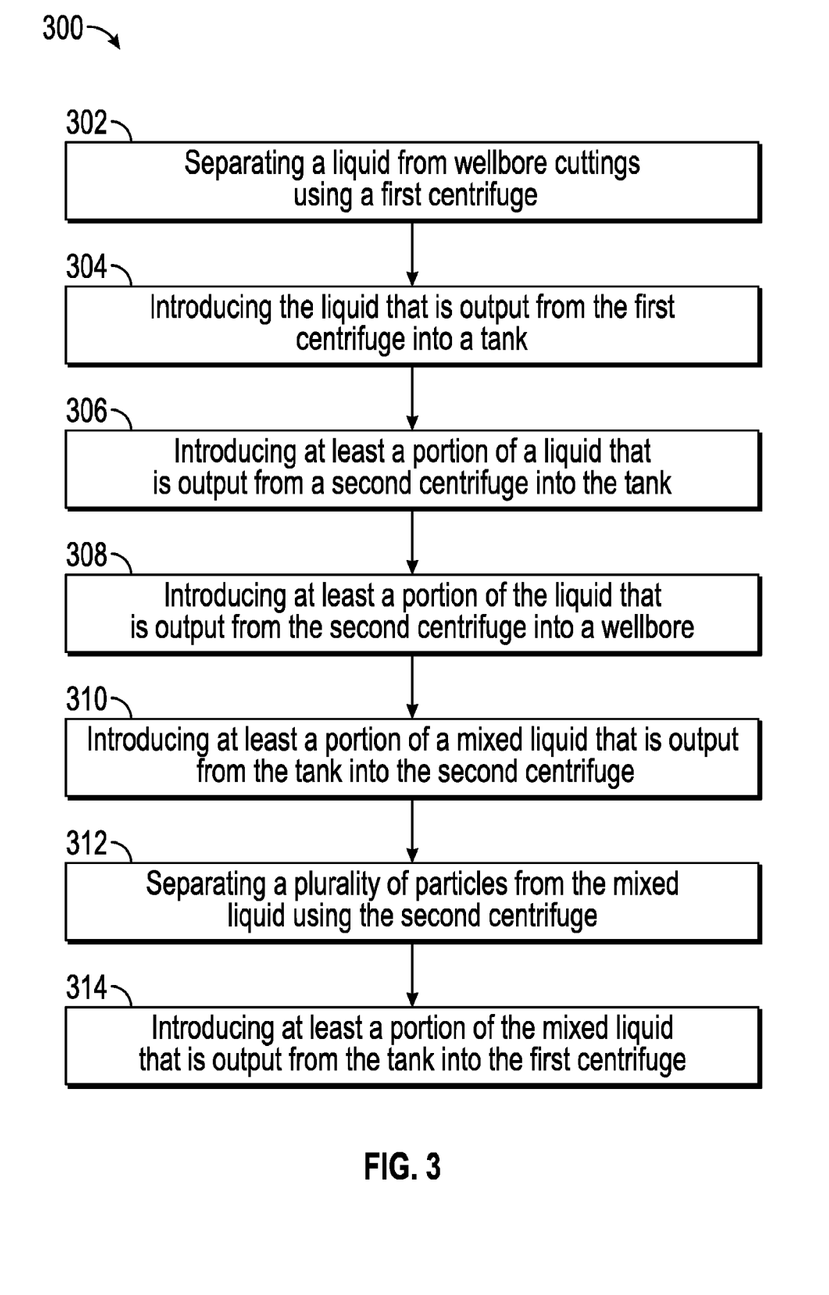
FIG. 3 depicts a flowchart of a method for recycling liquid that has been separated from wellbore cuttings, according to an embodiment.

FIG. 3 depicts a flowchart of a method 300 for recycling liquid that has been separated from wellbore cuttings, according to an embodiment. The method 300 may be performed using the system 200 shown in FIG. 2, and, as such, FIGS. 2 and 3 may be viewed together. However, in other embodiments, the method 300 may be performed with other systems.

The method 300 may begin by separating a liquid from a plurality of wellbore cuttings using the first centrifuge 100, as at 302 in FIG. 3. The cuttings may have an average cross-sectional length that is greater than or equal to about 1 mm. In one example, about 10 gallons per minute ("GPM") of liquid may be separated from the wellbore cuttings. The volumetric flow rates provided herein are for illustrative purposes and are not intended to be limiting. Thus, greater or lesser volumetric flow rates are also contemplated within the scope of this disclosure.

The liquid that is separated from the cuttings may have fine particles dispersed therein that increase the viscosity of the liquid. An additional liquid may be introduced to the first centrifuge 100 (e.g., into the launder section 118) and combined with the liquid that is separated from the cuttings to reduce the viscosity of (i.e., dilute) the liquid that is separated from the cuttings. As such, the additional liquid may facilitate flushing the liquid that is separated from the cuttings out of the first centrifuge 100. The additional liquid may be introduced into the first centrifuge 100 at about 40 GPM. Thus, the combined liquid may be output from the first centrifuge 100 at about 50 GPM (e.g., about 10 GPM separated from cuttings+about 40 GPM for flushing).

The liquid that is output from the first centrifuge 100 may be referred to as "dirty liquid." As used herein, the term "dirty liquid" refers to a liquid having greater than or equal to a first threshold of particles dispersed therein. The first threshold may be, for example, about 25 vol %. The particles may have an average cross-sectional length (e.g., diameter) ranging from about 1 μm to about 100 μm.

The method 300 may then include introducing the liquid that is output from the first centrifuge 100 (e.g., about 50 GPM of dirty liquid) into the tank 220, as at 304 in FIG. 3. More particularly, the liquid may be introduced into the first portion of the internal volume 236 of the tank 220 through the first inlet 222.

The method 300 may also include introducing at least a portion of a liquid that is output from the second centrifuge 210 (e.g., about 40 or about 50 GPM of clean liquid) into the tank 220, as at 306 in FIG. 3. More particularly, the liquid from the second centrifuge 210 may be introduced into the second portion of the internal volume 238 of the tank 220 through the second inlet 224. The liquid that is output from the second centrifuge 210 may be referred to as a "clean liquid." As used herein, the term "clean liquid" refers to a liquid having less than or equal to a second threshold of particles therein, where the second threshold is less than the first threshold. The second threshold may be, for example, about 10 vol %. The particles may have an average cross-sectional length (e.g., diameter) ranging from about 1 μm to about 100 μm.

The method 300 may also include introducing at least a portion of the clean liquid from the second centrifuge 210 (e.g., about 2 or about 8 GPM of clean liquid) into the wellbore, as at 308 in FIG. 3. In at least one embodiment, this portion of the clean liquid may bypass the tank 220 on the way to the wellbore. In another embodiment, this portion of the clean liquid may first flow into the second portion of the internal volume 238 of the tank 220 before being introduced into the wellbore. This portion of the clean liquid may flow through the first pump 250 on the way to the wellbore.

Returning now to the tank 220, the liquid from the first centrifuge 100 (e.g., about 50 GPM of dirty liquid) may flow from the first portion of the internal volume 236 of the tank 220 into the third portion of the internal volume 240 of the tank 220 as shown in FIG. 2. At least a portion of the liquid from the second centrifuge 210 (e.g., 40 GPM of clean liquid) may flow from the second portion of the internal volume 238 of the tank 220 into the third portion of the internal volume 240 of the tank 220. As a result, the dirty and clean liquids may be combined and mixed together in the third portion of the internal volume 240 of the tank 220. This may reduce the viscosity of (i.e., dilute) the dirty liquid, thereby forming a "mixed liquid."

As used herein, the term "mixed liquid" refers to a liquid having less than or equal to the first threshold of particles therein and greater than or equal to the second threshold of particles therein. For example, the mixed liquid may have from about 10 vol % particles to about 25 vol % particles. The particles have an average cross-sectional length (e.g., diameter) ranging from about 1 µm to about 100 µm.

The method 300 may also include introducing at least a portion of the mixed liquid that is output from the tank 220 (e.g., about 50 or about 52 GPM) into the second centrifuge 210, as at 310 in FIG. 3. The mixed liquid may flow through the second pump 252 on the way to the second centrifuge 210.

The method 300 may also include separating a plurality of particles from the mixed liquid using the second centrifuge 210, as at 312. For example, about 2 GPM of particles may be separated from the about 52 GPM of mixed liquid, leaving about 50 GPM of clean liquid. The particles may be output from the second centrifuge 210 and discarded (e.g., at about 2 GPM). The clean liquid may be output from the second centrifuge 210 and introduced into the tank 220, as discussed above at 306. Thus, the greater the flow rate of the mixed liquid to the second centrifuge 210, the greater the amount of liquid that may be recycled.

The method 300 may also include introducing at least a portion of the mixed liquid that is output from the tank 220 (e.g., about 40 GPM) into the first centrifuge 100, as at 314 in FIG. 3. This liquid may be the "additional liquid" referred to above that is introduced into the launder section 118 of the first centrifuge 100. This liquid may flow through the third pump 254 on the way to the first centrifuge 100.

One or more of the pumps (e.g., the first pump 250) may be configured to vary the flow rate therethrough to maintain the liquid level in the tank 220 between the predetermined minimum value 260 and the predetermined maximum value 262. For example, the first pump 250 may increase the flow rate therethrough from about 8 GPM to about 10 GPM if the liquid level in the tank 220 reaches or exceeds the predetermined maximum value, and/or the first pump 250 may decrease the flow rate therethrough from about 8 GPM to about 6 GPM if the liquid level in the tank 220 reaches or drops below the predetermined minimum value. In an embodiment, the system 200 may control the level of fluid in tank 220 by throttling pump output of the return fluid from, for example, the second centrifuge 210, to match or substantially match inlet fluid from, for example, the centrifuge 100 and/or one or more screens.

Figure 4:
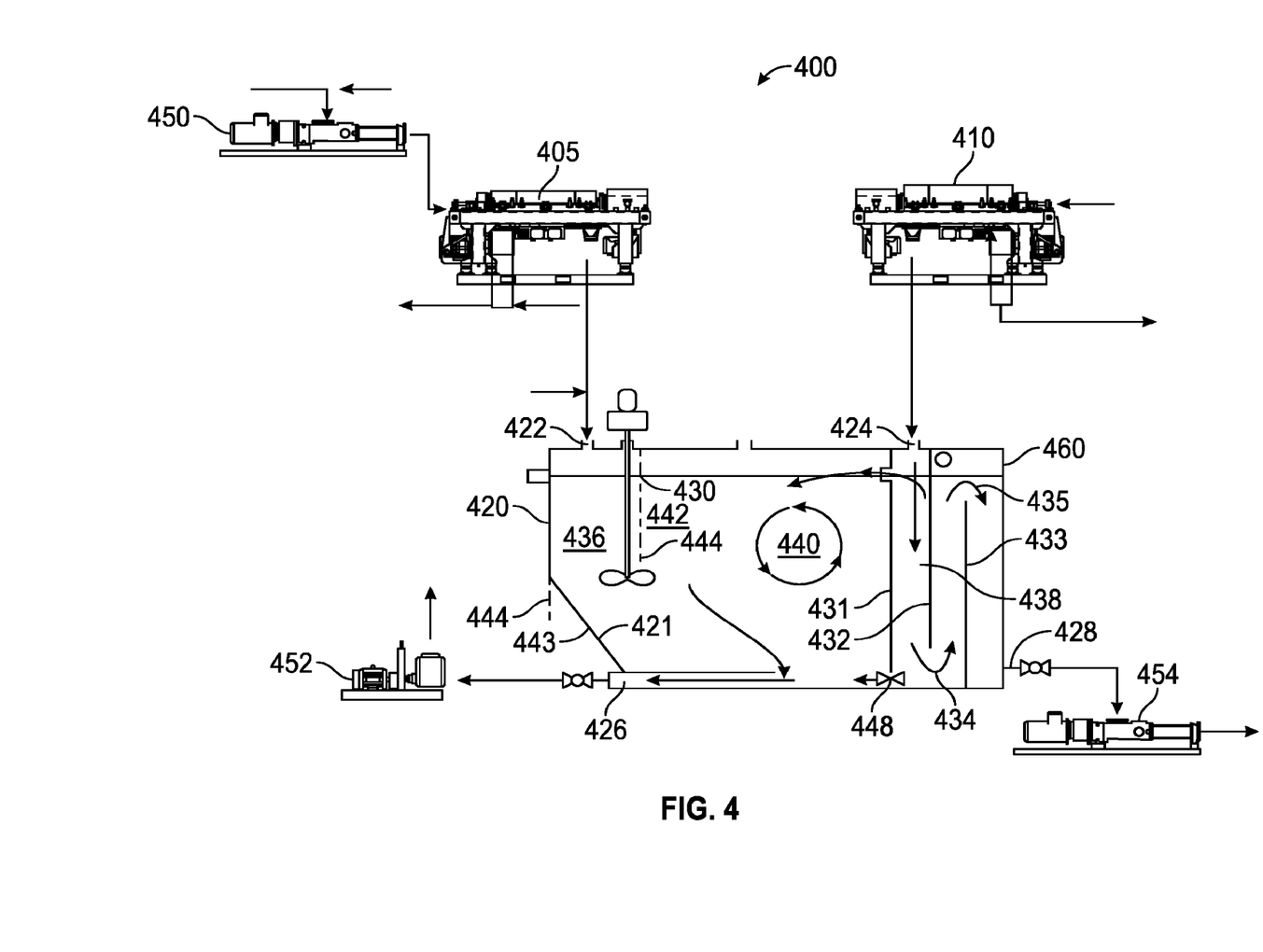
FIG. 4 depicts a schematic view of another system for recycling liquid that has been separated from wellbore cuttings, according to an embodiment.

FIG. 4 depicts a schematic view of another system 400 for recycling liquid that has been separated from wellbore cuttings, according to an embodiment. The system 400 may include a first centrifuge 405, a second centrifuge 410, a tank 420, and one or more pumps (three are shown: 450, 452, 454). As shown, the first centrifuge 405 may be or include a horizontal centrifugal decanter, and the second centrifuge 410 maybe also be a horizontal centrifugal decanter. The second centrifuge 410 may operate (e.g., rotate) at higher speeds than the first centrifuge 405.

The tank 420 may have one or more inlets (two are shown: 422, 424) and one or more outlets (two are shown: 426, 428). One or more partitions (four are shown: 430-433) may be positioned in an internal volume of the tank 220. The first and second partitions 430, 431 may at least partially separate different portions of the internal volume. For example, the first partition 430 may at least partially separate a first portion of the internal volume 436 from a third portion of the internal volume 440. The second partition 431 may at least partially separate a second portion of the internal volume 438 from the third portion of the internal volume 440.

In at least one embodiment, at least a portion of the first partition 430 may be oriented at an angle 442 with respect to a central longitudinal axis 444 through the tank 420. As shown, the portion of the first partition 430 may deflect toward or into the third portion of the internal volume 440 to direct fluid entering the first portion of the internal volume 436 of the tank 420 through the first inlet 422 to flow into the third portion of the internal volume 440 and mix with the liquid therein. The angle 442 may be from about 10 degrees to about 80 degrees or about 30 degrees to about 60 degrees. At least a portion of the side wall 421 of the tank 420 may also be oriented at an angle 443 with respect to the central longitudinal axis 444 through the tank 420 for the same purpose. The angle 443 may be from about 10 degrees to about 80 degrees or about 30 degrees to about 60 degrees.

In at least one embodiment, two or more of the partitions (e.g. partitions 431-433) may be assembled to form a winding path between the second inlet 424 and the second outlet 428. In another embodiment, the winding path may be formed by a hollow tube or the like. The winding path may include a first, lower turn 434 that may serve as a settling chamber that prevents solids from continuing through the path. The winding path may also include a second, upper turn 435 that may trap particles that are lighter than the liquid. The second turn 435 may also set the level of the tank 420, which may be controlled by a sensor (e.g., a float switch) 460, as discussed in more detail below.

An agitator 446 may also be positioned at least partially within the tank 420. As shown, the agitator 446 is positioned at least partially within the first portion of the internal volume 436 of the tank 420. However, in another embodiment, the agitator 446 may be positioned at least partially within the third portion of the internal volume 440 of the tank 420. The agitator 446 may be configured to facilitate the mixing of the liquids within the tank 420.

Figure 5:
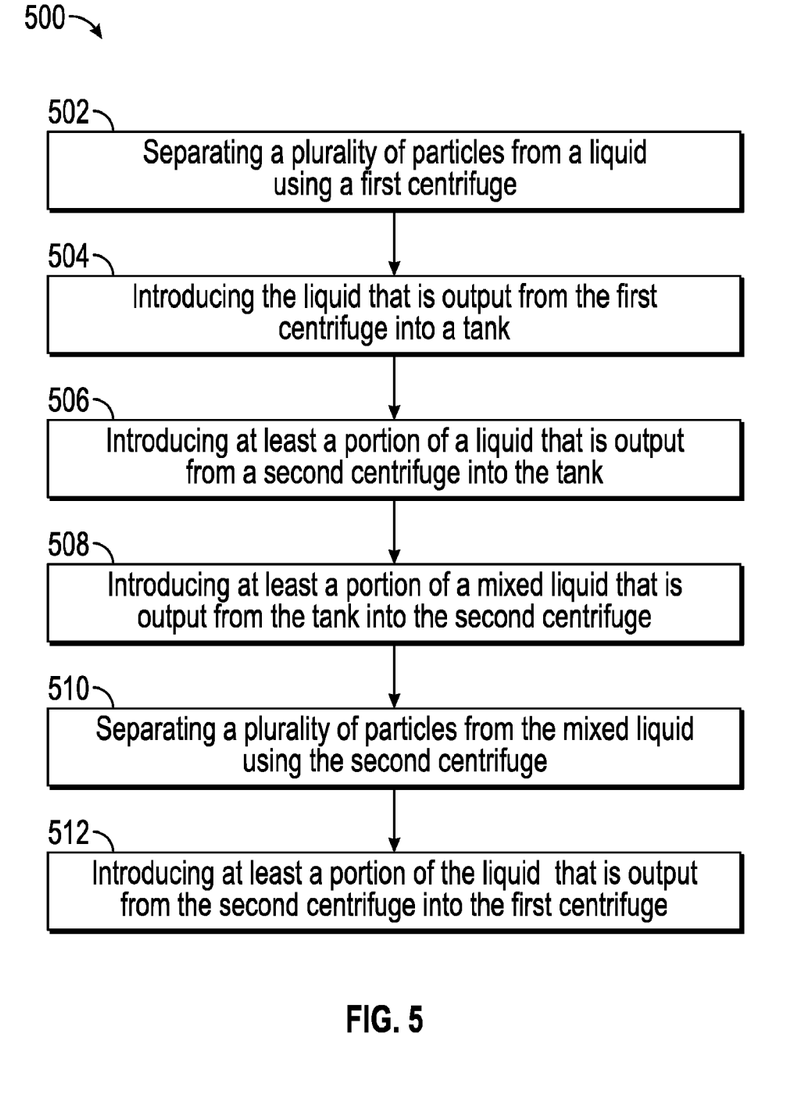
FIG. 5 depicts a flowchart of another method for recycling liquid that has been separated from wellbore cuttings, according to an embodiment.

FIG. 5 depicts a flowchart of another method 500 for recycling liquid that has been separated from wellbore cuttings, according to an embodiment. The method 500 may be performed using the system 400 shown in FIG. 4, and, as such, FIGS. 4 and 5 may be viewed together. However, in other embodiments, the method 500 may be performed with other systems.

The method 500 may begin by separating a plurality of particles from a liquid using the first centrifuge 405, as at 502 in FIG. 5. For example, about 33 GPM of liquid may flow from a shaker, through the first pump 450, and into the first centrifuge 405. The first centrifuge 405 may separate about 10 GPM of particles (e.g., barite) from the liquid. The particles may be flushed out of the first centrifuge 405 (e.g., the hopper of the first centrifuge 405) with about 13 GPM of liquid from the third pump 454, as discussed in greater detail below. This may form a liquid and particle slurry that flows out of the first centrifuge 405 at about 23 GPM. This slurry may be introduced back to the active system where it may be reintroduced back into the wellbore.

The liquid from which the particles have been removed may be output from the first centrifuge 405. The liquid from which the particles have been removed may still have fine particles dispersed therein that increase the viscosity of the liquid. As such, the liquid that is output from the first centrifuge 405 may be referred to as "dirty liquid."

The method 500 may then include introducing the liquid from which the particles have been removed (e.g., about 23 GPM of dirty liquid) from the first centrifuge 405 into the tank 420, as at 504 in FIG. 5. More particularly, the dirty liquid may be introduced into the first portion of the internal volume 436 of the tank 420 through the first inlet 422. In at least one embodiment, a flocculent may also be introduced into the tank 420 (e.g., at about 0.18 GPM).

For example, the flocculent may be combined with the dirty liquid prior to introducing the dirty liquid into the tank 420.

The method 500 may also include introducing at least a portion of a liquid that is output from the second centrifuge 410 (e.g., about 50 GPM of clean liquid) into the tank 420, as at 506 in FIG. 5. More particularly, the liquid from the second centrifuge 410 may be introduced into the second portion of the internal volume 438 of the tank 420 through the second inlet 424. The liquid that is output from the second centrifuge 410 may be referred to as a "clean liquid."

The liquid from the first centrifuge 100 (e.g., about 23 GPM of dirty liquid) may flow from the first portion of the internal volume 436 of the tank 420 into the third portion of the internal volume 440 of the tank 420. At least a portion of the liquid from the second centrifuge 410 (e.g., about 37 GPM of clean liquid) may flow from the second portion of the internal volume 438 of the tank 420 into the third portion of the internal volume 440 of the tank 420. As a result, the dirty and clean liquids may be combined and mixed together in the third portion of the internal volume 440 of the tank 420. The agitator 446 may enhance the mixing process. This may reduce the viscosity of (i.e., dilute) the dirty liquid, thereby forming a "mixed liquid."

The method 500 may also include introducing at least a portion of the mixed liquid that is output from the tank 420 (e.g., 60 GPM) into the second centrifuge 410, as at 508 in FIG. 6. The mixed liquid may flow through the second pump 452 on the way to the second centrifuge 410. In at least one embodiment, at least a portion of the clean liquid may be introduced to the second centrifuge 410 to dilute the suction to the second centrifuge 410. This flow may be regulated by a valve 448 within the tank 420.

The method 500 may also include separating a plurality of particles from the mixed liquid using the second centrifuge 410, as at 510 in FIG. 5. For example, about 10 GPM of particles may be separated from the about 60 GPM of mixed fluid, leaving about 50 GPM of clean liquid. The particles may be output from the second centrifuge 410 and discarded. The clean liquid may be output from the second centrifuge 410 and introduced into the tank 420, as discussed above, at 506 in FIG. 5.

The method 500 may also include introducing at least a portion of the clean liquid that is output from the second centrifuge 410 (e.g., about 13 GPM) into the first centrifuge 405, as at 512 in FIG. 5. As shown, this liquid may first be introduced into the tank 420 before being introduced into the first centrifuge 405. This liquid may be the liquid referred to above that is used to flush the particles (e.g., barite) out of the hopper of the first centrifuge 405. This liquid may flow through the third pump 454 on the way to the first centrifuge 405.

In at least one embodiment, one or more sensors 460 may be positioned within the tank 420 and configured to measure the level of the liquid in the tank 420. One or more of the pumps (e.g., the third pump 454) may be configured to vary or throttle the flow rate therethrough to maintain the liquid level in the tank 420 between a predetermined minimum value and predetermined maximum value. For example, the third pump 454 may increase the flow rate therethrough from about 13 GPM to about 15 GPM if the liquid level in the tank 420 reaches or exceeds the predetermined maximum value, and/or the third pump 454 may decrease the flow rate therethrough from about 13 GPM to about 11 GPM if the liquid level in the tank 420 reaches or drops below the predetermined minimum value.

As will be appreciated, the methods 200, 400 described above may be performed in any order. In other words, the methods 200, 400 are not limited to being performed in the order described above. Each method 200, 400 includes one or more loops that may occur multiple times.

When introducing elements of various embodiments of the present disclosure, the articles "a," "an," and "the" are intended to mean that there are one or more of the elements. As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A method comprising:
   partitioning an internal volume of a tank into a first portion, a second portion and a third portion, wherein the third portion is provided between the first and second portions;
   introducing at least a first portion of a first liquid from a first centrifuge into the first portion of the internal volume of the tank;
   introducing at least a first portion of a second liquid from a second centrifuge into the second portion of the internal volume of the tank;
   directing the first portion of the first liquid and the first portion of the second liquid to flow into the third portion of the internal volume of the tank, wherein a surface, oriented at an angle with respect to a central longitudinal axis through the tank, deflects the first portion of the first liquid to flow into the third portion of the internal volume and the angle is from about 10 degrees to about 80 degrees;
   mixing the first portion of the first liquid and the first portion of the second liquid together in the third portion of the internal volume of the tank to produce a mixed liquid;
   introducing at least a first portion of the mixed liquid from the tank into the second centrifuge; and
   separating a plurality of particles from the first portion of the mixed liquid using the second centrifuge, thereby producing at least a second portion of the second liquid that is introduced from the second centrifuge into the tank.

2. The method of claim 1, further comprising:
   introducing at least a second portion of the mixed liquid from the tank into the first centrifuge.

3. The method of claim 2, further comprising:
separating a third liquid from a plurality of cuttings from a wellbore using the first centrifuge, wherein the third liquid makes up at least a portion of the first liquid.

4. The method of claim 3, wherein the third liquid is separated from the plurality of cuttings in a separation section of the first centrifuge, and further wherein the second portion of the mixed liquid from the tank is introduced into a launder section of the first centrifuge.

5. The method of claim 4, wherein the third liquid and the second portion of the mixed liquid are mixed together in the launder section of the first centrifuge to produce a second portion of the first liquid.

6. The method of claim 1, further comprising:
introducing at least a third portion of the second liquid from the second centrifuge into a wellbore.

7. The method of claim 1, wherein the first centrifuge comprises a vertical centrifugal dryer, and wherein the second centrifuge comprises a horizontal centrifugal decanter.

8. The method of claim 1, wherein the particles in the mixed liquid make up from about 10 percent volume to about 25 percent volume of the mixed liquid.

9. The method of claim 8, wherein the particles have an average cross-sectional length from about 1 micrometer to about 100 micrometers.

10. A method for recycling a liquid, comprising:
partitioning an internal volume of a tank into a first portion, a second portion and a third portion, wherein the third portion is provided between the first and second portions
introducing at least a first portion of a first liquid from a first centrifuge into the first portion of the internal volume of the tank;
introducing at least a first portion of a second liquid from a second centrifuge into the first centrifuge;
introducing at least a second portion of the second liquid from the second centrifuge into the second portion of the internal volume of the tank,
directing the second portion of the second liquid to flow into the third portion of the internal volume of the tank and deflecting the first portion of the first liquid at an angle with respect to a central longitudinal axis through the tank to flow into the third portion of the internal volume of the tank, wherein the angle is from about 10 degrees to about 80 degrees;
mixing the first portion of the first liquid and the second portion of the second liquid together in the third portion of the internal volume of the tank to produce a mixed liquid;
introducing at least a first portion of the mixed liquid from the tank into the second centrifuge; and
separating a first plurality of particles from the first portion of the mixed liquid using the second centrifuge, thereby producing at least a third portion of the second liquid that is introduced from the second centrifuge into the first centrifuge, the at least second portion of the second liquid that is introduced from the second centrifuge into the tank, or both.

11. The method of claim 10, wherein the at least third portion of the second liquid is produced by the separating, and further wherein the at least third portion of the second liquid, that is introduced from the second centrifuge into the first centrifuge, is introduced into the tank prior to being introduced into the first centrifuge.

12. The method of claim 10, further comprising: separating a plurality of particles from an initial liquid using the first centrifuge to produce the first liquid; wherein the first liquid comprises a second plurality of particles.

13. The method of claim 12, wherein the at least third portion of the second liquid is produced by the separating; and wherein the at least third portion of the second liquid from the second centrifuge that is introduced into the first centrifuge is mixed with the second plurality of particles to flush the second plurality of particles out of the first centrifuge.

14. The method of claim 12, wherein the second plurality of particles have an average cross-sectional length from about 1 micrometer to about 100 micrometers.

15. The method of claim 12, wherein the second plurality of particles in the first liquid make up greater than or equal to about 25 percent volume of the first liquid.

16. The method of claim 15, wherein the first plurality of particles in the mixed liquid make up from about 10 percent volume to about 25 percent volume of the mixed liquid.

17. The method of claim 10, wherein the first and second centrifuges both comprise horizontal centrifugal decanters.

18. A system for recycling a liquid, comprising:
a first centrifuge;
a second centrifuge; and
a tank comprising:
a first partition provided in an internal volume of the tank;
at least one second partition provided in the internal volume of the tank such that the internal volume of the tank is partitioned into a first portion, an opposite second portion and a third portion between the first and second portions;
a first inlet adjacent to the first portion of the internal volume and configured to receive a first liquid from the first centrifuge;
a second inlet adjacent to the second portion of the internal volume and configured to receive at least a first portion of a second liquid from the second centrifuge;
a side wall of the tank or a portion of the first partition, oriented at an angle with respect to a central longitudinal axis through the tank, configured for deflecting or directing the first liquid received from the first centrifuge to flow into the third portion of the internal volume of the tank, wherein the first liquid and the first portion of the second liquid mix together in the third portion of the internal volume of the tank to produce a mixed liquid and the angle is from about 10 degrees to about 80 degrees; and
a first outlet configured to output at least a first portion of the mixed liquid to the second centrifuge, wherein the second centrifuge is configured to separate a plurality of particles from the first portion of the mixed liquid, thereby producing a second portion of the second liquid that is introduced from the second centrifuge into the tank.

19. The system of claim 18, wherein the tank further comprises a second outlet configured to output at least a second portion of the mixed liquid to the first centrifuge.

* * * * *